US005248878A

United States Patent [19]

Ihara

[11] Patent Number: 5,248,878

[45] Date of Patent: Sep. 28, 1993

[54] GOLF BALL MARKING METHOD

[75] Inventor: Keisuke Ihara, Yokohama, Japan

[73] Assignee: Bridgestone Corporation, Tokyo, Japan

[21] Appl. No.: 840,084

[22] Filed: Feb. 24, 1992

[30] Foreign Application Priority Data

Feb. 25, 1991 [JP] Japan .................................... 3-53333

[51] Int. Cl.$^{5}$ .............................................. B23K 26/00

[52] U.S. Cl. ................................ 219/121.69; 264/25; 219/121.66; 346/76 L

[58] Field of Search ...................... 219/121.68, 121.69, 219/121.66; 346/76 L; 156/146; 264/25, 80

[56] References Cited

U.S. PATENT DOCUMENTS

| | | | |
|---|---|---|---|
| 4,808,966 | 2/1989 | Ferlier et al. | 219/121.68 X |
| 4,945,204 | 7/1990 | Nakamura et al. | 219/121.65 |
| 4,994,639 | 2/1991 | Dickinson et al. | 219/121.69 |
| 4,997,994 | 3/1991 | Andrews et al. | 219/121.68 X |
| 5,111,523 | 5/1992 | Ferlier et al. | 385/100 |

*Primary Examiner*—C. L. Albritton
*Attorney, Agent, or Firm*—Sughrue, Mion, Zinn, Macpeak & Seas

[57] ABSTRACT

A golf ball is marked by directing laser light to a selected surface portion of the ball, thereby causing the exposed surface layer portion to change its color. The discolored portion forms an identification mark on the ball surface. The mark is durable and aesthetically attractive while the ball maintains dimensional precision.

5 Claims, 2 Drawing Sheets

GOLF BALL MARKING METHOD

This invention relates to a method for applying marks or symbols on a golf ball without adversely affecting the sphericity and dimple precision of the ball, the marks or symbols being aesthetically acceptable, free of any inconvenience such as skew or blur, and durable.

BACKGROUND OF THE INVENTION

Most commercial golf balls bear marks or symbols indicative of a trade name or play number on their surface. Prior art marking methods include (1) the use of transfer tape, (2) stamping, (3) pad printing also known as curved surface printing in which an ink image is transferred once from a block copy to a pad and then from the pad to a golf ball, and (4) inscription of a mark on the cavity of a golf ball forming mold. However, all these methods have drawbacks.

(1) The use of transfer tape is based on heat transfer with the risk of leaving substantial deformation on the ball surface due to heat and pressure applied, detracting from the sphericity and dimple precision of the ball. If the mark is of large size, poor adhesion often occurs because of non-uniform bonding forces or air bubble trapping. It is then necessary to protect the mark with a coating film on the ball surface. (2) Method of stamping balls is by either stamping balls through inked tape or applying an inked stamp against balls. In either case, the ink used is likely to blur and ooze, failing to provide an aesthetically acceptable finish. Since ink has to invade the ball surface, stamping can often detract from the sphericity of the ball. (3) Pad printing requires an extra step of preparing a block copy and the adhesion of marks is poor. In printing on curved surfaces like golf ball surfaces, the pattern is often distorted failing to achieve an aesthetically acceptable finish. (4) Mold inscription is a laborious operation and the application of ink on every molding cycle requires a number of steps. This method is quite difficult to carry out in practice.

There exists a demand for a novel golf ball marking method which eliminates the drawbacks of these prior art methods.

SUMMARY OF THE INVENTION

Therefore, an object of the present invention is to provide a novel and improved golf ball marking method which can form aesthetically acceptable, durable marks including characters and symbols on a golf ball without any inconvenience such as blur, skew or ooze, and without adversely affecting the sphericity and dimple precision of the ball. Another object of the present invention is to provide a golf ball which has an aesthetically acceptable, durable mark formed by this method and which retains sphericity and dimple precision.

I have attempted to use laser light. When laser light is irradiated to a golf ball, the exposed portion of a golf ball surface layer which is often composed of an ionomer resin undergoes chemical changes to change its color. The once discolored portion retains stable color tone over an extended period of time. This discolored portion can form an indication, which is aesthetically and definitely delimited and free of any inconvenience like blur, skew or ooze. Since no stresses are applied to the golf ball itself, there is no loss of sphericity and dimple precision. The present invention is predicated on this finding.

According to the present invention, there is provided a method for marking a golf ball comprising the step of directing laser light to a selected portion of a golf ball on its surface, thereby causing the portion of a golf ball surface layer exposed to laser light to change its color. The discolored portion forms a desired indication on the ball surface.

Also contemplated herein is a golf ball marked by this method.

DESCRIPTION OF THE PREFERRED EMBODIMENTS

The golf ball marking method of the present invention forms a mark on a golf ball by directing laser light to a selected surface portion of the golf ball, thereby causing the laser light-irradiated portion of a golf ball surface layer to change its color. Any type of laser light may be used herein and a suitable type of laser light is chosen depending on the type of material of which a golf ball surface layer is made. Preferred are laser beams having a wavelength of the order of 1 μm or less as produced by excimer laser and YAG laser devices.

Any type of golf ball can be marked by the method of the invention as long as the ball has a surface layer of material subject to discoloration by laser light. Included are two-piece balls and thread-wound balls coated with ionomer or balata covers and one-piece balls formed of polybutadiene rubber or the like. Golf balls are usually finished with lacquer coatings, and laser light irradiation may be carried out prior to or subsequent to such lacquer coating. In the latter case, laser light is irradiated to the lacquer coating. Further the marking method of the present invention eliminates a need for protective coating since the indication formed thereby is enough durable to make it unnecessary to protect the indication with a coating.

In the marking method of the invention, parameters of laser light including type, wavelength, exposure time, and shot number may be selected, depending on the type of resin forming the ball surface, so as to properly control the degree of chemical change and the change of color therewith. A mark of controlled color tone is thus established. Usually the exposure time ranges from about 0.01 to about 10 seconds and the number of shots ranges from 1 to about 10,000 shots (0.1 Hz to 10 kHz repetition, preferably 0.1 to 200 Hz for excimer laser and 1 to 10 kHz for YAG laser). The total energy is preferably about 0.1 to about 5 W and more preferably 0.1 to 0.5 W for excimer laser and 1 to 3 W for YAG laser.

According to the marking method of the invention, exposure of a golf ball to laser light creates a discolored portion on the golf ball surface which forms an indication. A desired shape of indication may be configured by various procedures, for example, by passing laser light through a masking filter having an aperture of a shape corresponding to the desired indication shape, obtaining laser light having a cross section rectified to the desired indication shape and directing this shaped laser light to a golf ball surface. Alternatively, laser light is focused to a pin point and scanned on a golf ball surface to draw a desired shape of indication thereon.

Figure 1:
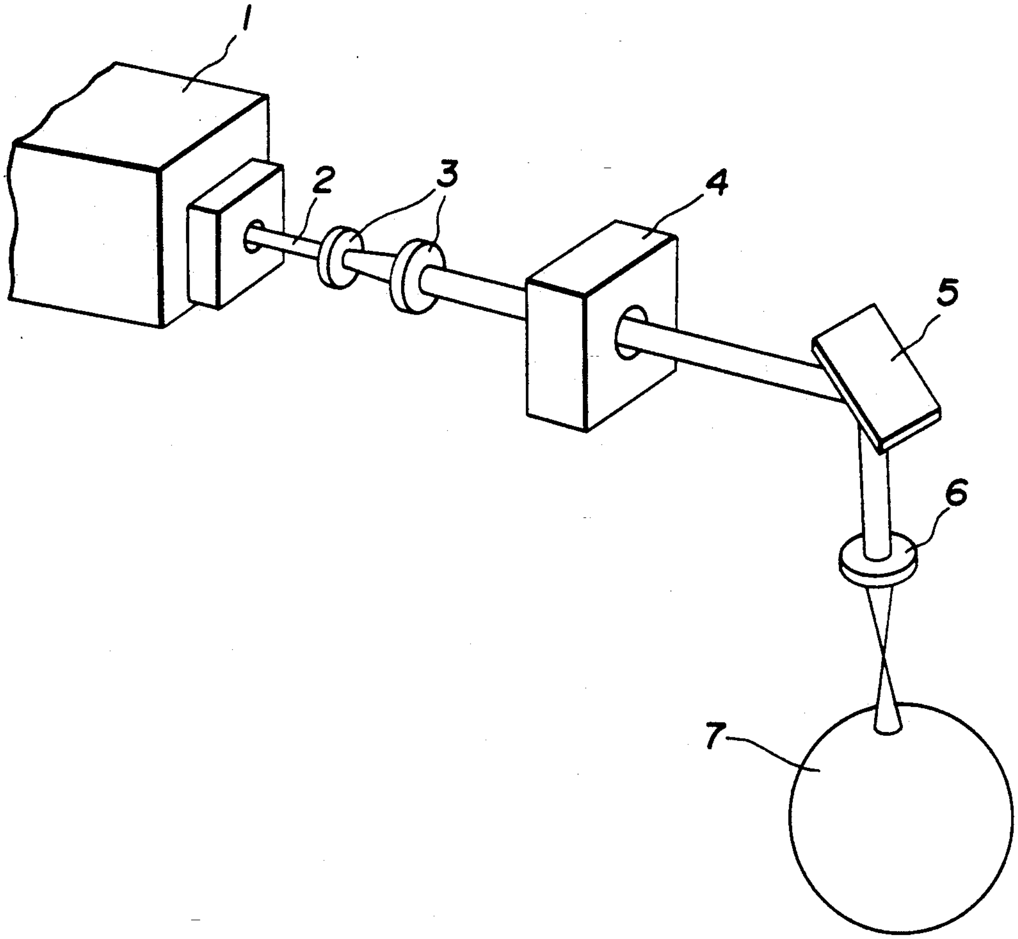
FIG. 1 is a schematic illustration of a system for carrying out the golf ball marking method of the invention.

These procedures are described in more detail. The first procedure is implemented by a system as illustrated in FIG. 1. A laser oscillator 1 emits a laser beam 2 which is amplified by a beam expander 3 and then passed through a masking filter 4 having an aperture of a shape corresponding to the desired indication shape. At this point, there is obtained a laser beam having a cross section rectified to the desired indication shape. This shaped laser beam 2 is directed to a golf ball 7 surface through a reflector 5 and a focusing lens 6. The portion of a surface layer of the golf ball 7 exposed to the shaped laser beam 2 is thus discolored so that the desired shape of indication is formed on the ball surface. It will be understood that the reflector 5 is effective for adjusting the position at which the laser beam is directed, and the laser beam 2 which has been once reversed by the reflector 5 is reversed once again by the focusing lens 6.

Figure 2:
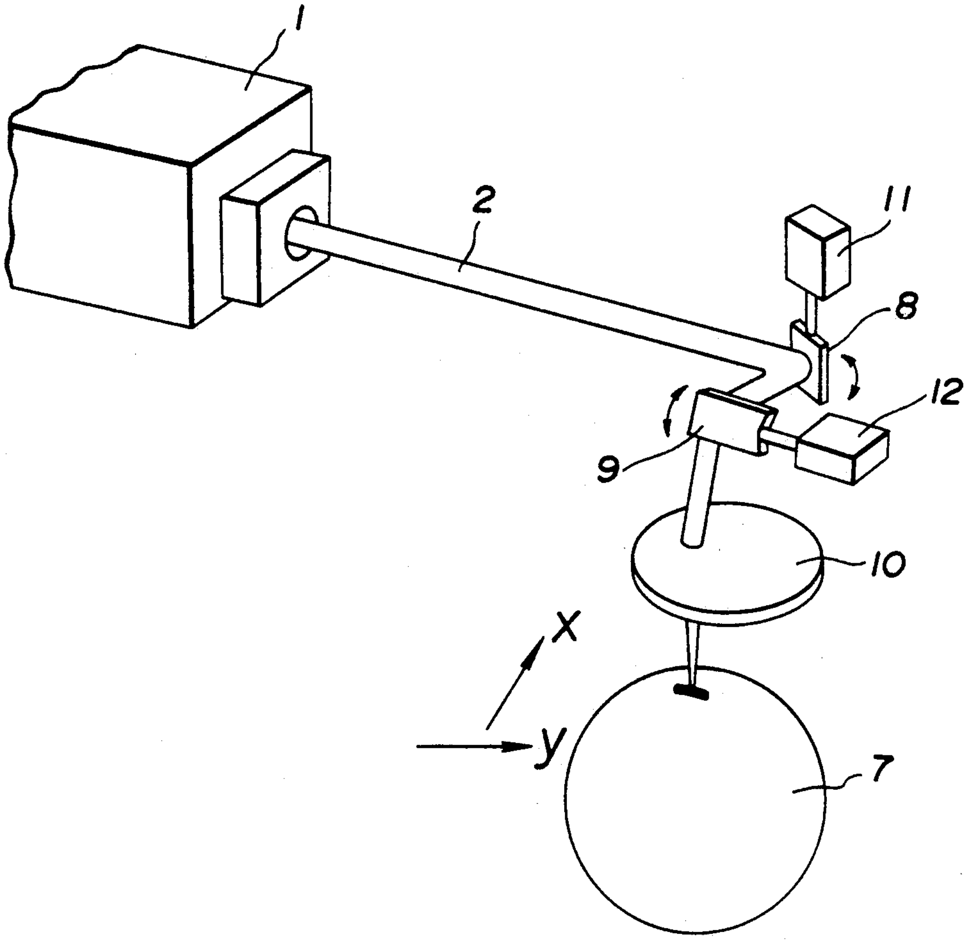
FIG. 2 is a schematic illustration of another system for carrying out the golf ball marking method of the invention.

The second procedure is implemented by a system as illustrated in FIG. 2. A laser oscillator 1 emits a laser beam 2 which is guided through a reflector 8 adapted to rotate about y axis and a reflector 9 adapted to rotate about x axis to a f$\theta$ lens 10 located above a position of a golf ball 7 to be marked. The lens 10 is effective for focusing the laser beam 2 to a pin point at the golf ball 7 surface. While the reflectors 8 and 9 are continuously rotated about y and x axes, respectively, by respective drives 11 and 12 which are, in turn, controlled by a computer (not shown), the laser beam 2 focused to a pin point is scanned on a x-y plane on the golf ball 7 to draw the desired shape of indication. The portion of a golf ball surface layer scanned with the pin pointing laser beam 2 is thus discolored so that the desired shape of indication is formed on the ball surface.

EXAMPLE

An example of the present invention is given below by way of illustration and not by way of limitation.

Using the system shown in FIG. 1, a two-piece golf ball coated with an ionomer cover (a 50/50 mixture of Himilan 1706/1605, Mitsui DuPont K. K.) was marked according to the first procedure mentioned above. Processing conditions are given below.

| | |
|---|---|
| Experiment 1 | |
| Laser light | Excimer laser KrF, wavelength 193 nm, total energy 0.35 W |
| Shot | 100 shots (100 Hz repetition) |
| Exposure time | 1 second |
| Experiment 2 | |
| Laser light | Nd: YAG laser, wavelength 532 nm, total energy 1 to 3 W (optimum 2 W) |
| Shot | 10 to 10,000 (optimum 500) |

-continued

| | |
|---|---|
| | (1 kHz to 10 kHz (optimum 5 kHz) repetition) |
| Exposure time | 0.01 to 1 second (optimum 0.1 second) |

On the golf ball surfaces, aesthetically attractive marks were formed without blur, ooze or skew. The balls experienced no change in outer diameter and sphericity, maintaining the dimensional precision completely unchanged from the initial. The marks or discolored portions were dug about 0.02 mm deep, which step was shallower than marking by stamping and other conventional methods followed by coating.

The thus marked golf balls were examined for hitting durability, solvent resistance and adhesion, to find satisfactory results in every factor. More particularly, the balls were tested without surface coating for mark protection. When the balls were hit 300 times by a driver, the marks were not erased. When the balls were dipped in toluene for 72 hours, the marks remained unchanged, indicating solvent resistance. Further, the marks withstood the adhesive tape test in which adhesive tape was applied to the marked portions of the balls and then peeled off.

There has been described a golf ball marking method capable of forming an aesthetically attractive indication free of blur, ooze or skew without detracting from the sphericity and dimple precision of the ball. The golf ball marked by this method bears an aesthetically attractive, durable identification mark thereon while retaining the given sphericity and dimple precision.

While the invention has been described in what is presently considered to be a preferred embodiment, other variations and modifications will become apparent to those skilled in the art. It is intended, therefore, that the invention not be limited to the illustrative embodiments, but be interpreted within the full spirit and scope of the appended claims.

I claim:

1. A method for marking a golf ball comprising the step of:

directing laser light to a selected portion of a golf ball on its surface, thereby causing the portion of a golf ball surface layer exposed to laser light to change its color, the discolored portion forming a desired indication on the ball surface.

2. The marking method of claim 1 which further includes the step of shaping the laser light to a shape corresponding to the desired shape of indication.

3. The marking method of claim 1 which further includes the step of scanning the laser light.

4. The marking method of claim 1 which further includes the step of controlling the dose of laser light to achieve a desired change of color.

5. A golf ball marked by the method of claim 1.

* * * * *